P. DRAGAN, C. D. GEORGE & R. J. PALMERIO.
TROLLEY GUARD.
APPLICATION FILED MAR. 9, 1912.
1,078,489.
Patented Nov. 11, 1913.
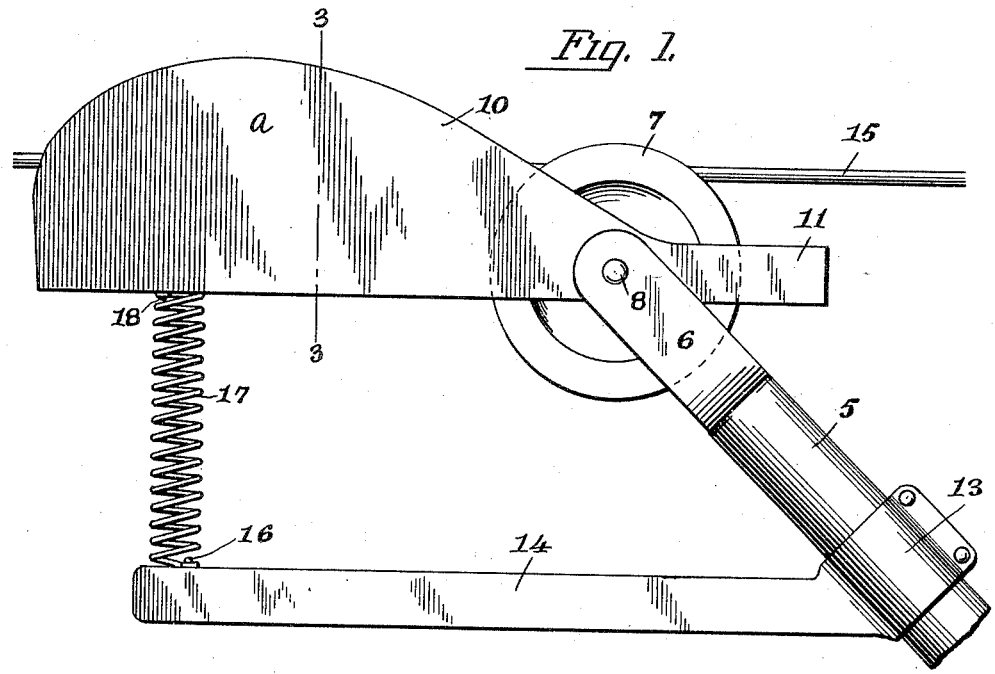
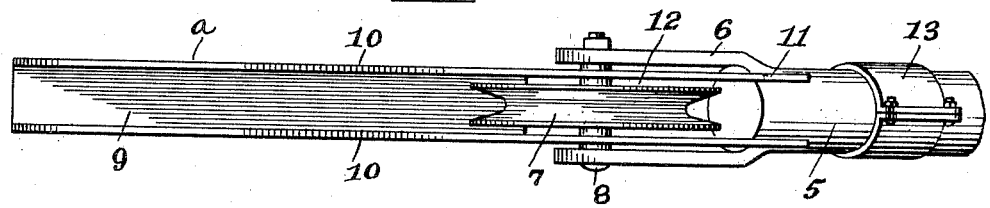
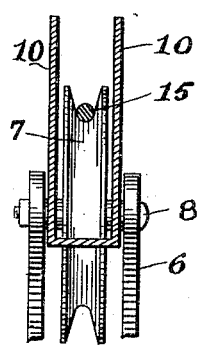
Inventors
Philip Dragan,
Charles D. George and
Raymond J. Palmerio
By Victor J. Evans
Attorney
Witnesses

UNITED STATES PATENT OFFICE.

PHILIP DRAGAN, CHARLES D. GEORGE, AND RAYMOND J. PALMERIO, OF PHILADELPHIA, PENNSYLVANIA.

TROLLEY-GUARD.

1,078,489. Specification of Letters Patent. Patented Nov. 11, 1913.

Application filed March 9, 1912. Serial No. 682,612.

*To all whom it may concern:*

Be it known that we, PHILIP DRAGAN, CHARLES D. GEORGE, and RAYMOND J. PALMERIO, citizens of the United States, residing at Philadelphia, in the county of Philadelphia and State of Pennsylvania, have invented new and useful Improvements in Trolley-Guards, of which the following is a specification.

The general object of this invention is to provide a trolley guard of very simple construction which will effectively and positively return a conductor wire upon the trolley wheel after passing an obstruction and which will furthermore provide for slight variations in the angular position of the trolley pole with respect to the car.

In carrying out the object of the invention generally stated above, it will be understood of course, that the essential features thereof are necessarily susceptible to changes in details and structural arrangement, one preferred and practical embodiment being shown in the accompanying drawings, wherein:—

Figure 1 is a side elevation of the trolley guard constructed in accordance with the invention. Fig. 2 is a top plan view thereof. Fig. 3 is a sectional view on the line 3—3 of Fig. 1.

Referring more particularly to the accompanying drawings by numerals it will be seen that the invention comprises the usual well known trolley pole 5 having a harp 6 at its upper end in which the trolley wheel 7 is rotatably supported by means of the stub shaft 8.

The trolley guard proper is indicated by (*a*) and comprises a bottom 9 and upwardly extending spaced parallel sides 10 formed integrally with said bottom and made of suitable conducting material such as sheet metal. The upper edges of the sides 10 are substantially arcuate and inclined for a major portion of their length, and merge adjacent their forward ends into straight extremities, thus providing the guard (*a*) with a relatively narrow extension 11 at its forward end. The bottom 9 of the harp is provided adjacent its forward end with an elongated longitudinally extending slot 12 which is adapted to encircle the trolley wheel 7 when said guard is mounted upon the shaft 8 between the inner sides of the harp 6 and the wheel 7.

Adjustably secured to the pole 5 a suitable distance below the harp 6 is a collar 13 which is adapted to embrace said pole and which has extending rearwardly therefrom an elongated supporting arm 14 which normally maintains a horizontal position when the wheel 7 is in engagement with the conductor wire 15. Adjacent the free end of the supporting arm 14 secured by any means such as rivets 16 is an expansion spring 17 which has its farther end secured adjacent the rear end of the bottom 9 of the guard by suitable rivets 18, said spring being adapted to retain the guard in a normally horizontal position so that the conducting wire 15 will pass between the sides 10 of said guard.

When the trolley wheel 7 comes in contact with an obstruction the same is forced downwardly out of engagement with the wire 15 and this movement causes the forward extension 11 to move downwardly also by reason of the fact that the said guard is adapted to oscillate upon the shaft 8. However the expansion spring 17 maintains the rear end of the guide in substantially its normal position until the said obstruction comes in contact with the inclined top edges of the said sides 10. After the wheel 7 has passed the obstruction mentioned, said wheel will again engage the wire 15 and said obstruction will then come in contact with the inclined edges of the sides 10 and force the rear end of the guard (*a*) downwardly. After the said guard has passed the obstruction it will again assume its normal position by reason of the action of the spring 17. It will thus be seen that when the wheel 7 is out of contact with the wire 15 the sides 10 of the guard act as a guide for the wheel so that when the latter has passed the obstruction it will be permitted to easily assume its normal position in contact with said wire.

It will be thus obvious from the foregoing description that an efficient guard has been provided which is positive in operation and simple in construction thus reducing the cost of manufacture of the same.

Having thus described our invention what we claim as new is:—

The combination with a trolley wheel, of a trolley guard movably mounted on the wheel pivot near its front end said guard comprising spaced parallel plates connected at their lower edges by a bottom plate extending from a point to the rear of the pivotal support of the guard to the rear end thereof, the upper edges of the plates extending when the guard is in position from a point above the trolley pivot toward a point in coincidence with the trolley wire as it leaves the trolley wheel, the upper edges rearwardly beyond said point being of arcuate formation and arranged throughout their lengths above the trolley wire when in normal position, the maximum height of said side plates being relatively remote from the trolley wheel, an arm adjustably connected to the trolley pole and projecting in spaced parallel relation with the lower edge of the guard when the latter is in normal position, and a spring interposed between said arm and bottom plate of the guard.

In testimony whereof we affix our signatures in presence of two witnesses.

PHILIP DRAGAN.
CHARLES D. GEORGE.
RAYMOND J. PALMERIO.

Witnesses:
Louis M. Fridenberg,
Norman J. Smith.

Copies of this patent may be obtained for five cents each, by addressing the "Commissioner of Patents, Washington, D. C."